United States Patent [19]
Brandt et al.

[11] 4,159,453
[45] Jun. 26, 1979

[54] HYDROGEN-GAS-LASER METHOD AND APPARATUS

[75] Inventors: Dietrich Brandt, Hildesheim; Christoph Ottinger, Goettingen, both of Fed. Rep. of Germany

[73] Assignee: Max-Planck-Gesellschaft zur Foerderung der Wissenschaften e.V., Goettingen, Fed. Rep. of Germany

[21] Appl. No.: 927,835

[22] Filed: Jul. 25, 1978

Related U.S. Application Data

[63] Continuation of Ser. No. 751,142, Dec. 16, 1976, abandoned.

[30] Foreign Application Priority Data

Nov. 30, 1976 [DE] Fed. Rep. of Germany ....... 2654254

[51] Int. Cl.² ................................................ H01S 3/22
[52] U.S. Cl. ......................... 331/94.5 G; 331/94.5 PE

[58] Field of Search ................... 331/94.5 G, 94.5 P, 331/94.5 PE; 330/4.3

[56] References Cited

U.S. PATENT DOCUMENTS 3,412,345  11/1968  Friedl et al. ................. 331/94.5 G Primary Examiner—William L. Sikes
Attorney, Agent, or Firm—Frishauf, Holtz, Goodman & Woodward

[57] ABSTRACT

The present specification describes a method for pumping molecular hydrogen in a hydrogen laser. The pumping is carried out via noble gas atoms which are in a metastable state of excitation and preferably ionized. A hydrogen laser operating in accordance with this method comprises a gas filling including molecular hydrogen as a laser medium and at least one noble gas, preferably argon, and pumping means adapted to produce noble gas atoms which are in a metastable state of excitation, preferably metastable argon ions.

10 Claims, 2 Drawing Figures

HYDROGEN-GAS-LASER METHOD AND APPARATUS

This is a continuation of application Ser. No. 751,142, filed Dec. 16, 1976 and now abandoned.

BACKGROUND OF THE INVENTION

1. Field to which the invention relates

The present invention relates to a method for excitation of, that is to say production of, a population inversion in molecular hydrogen in a hydrogen laser, and to hydrogen lasers for carrying out such methods.

2. The prior art

Hydrogen lasers with molecular hydrogen as a laser medium are described for example in the paper of R. W. Dreyfus and R. T. Hodgson in Phys. Rev. A9 (1974) 2635. In the case of these prior art hydrogen lasers a singly state of the hydrogen molecule is produced by electron collision excitation. These prior art lasers are not continuously tunable.

SHORT SUMMARY OF THE INVENTION

The present invention has the object of providing methods for the pumping of molecular hydrogen, which forms the laser-active medium of a gas laser, and of providing a gas laser operating with molecular hydrogen as an active component and which makes possible a continuous tuning in the UV range with a high efficiency.

In accordance with a first feature of the invention this aim is achieved in that the excitation is carried out by noble gas atoms, which are in a metastable state of excitation. Preferably the noble gas atoms are singly ionized, more particularly in the case of the noble gas argon, which is preferably used.

In accordance with a second feature of the invention an energy level of the molecular hydrogen is produced by excitation, from which a stimulated forced transition into another, nonbinding molecular state, that is to say in the dissociated state, of the original hydrogen molecule is possible.

One embodiment of a gas laser operating with molecular hydrogen as the laser active component in accordance with the invention comprises a gas filling made up of a mixture of hydrogen and at least one noble gas, preferably argon.

The invention makes it possible to obtain continuous tuning of the laser radiation in the wavelength range of approximately 1600 to 3600 A and the selection of any desired emission wavelength in this range and it also makes possible the production of intensive laser radiation with a high efficiency.

The invention is not restricted to a specific hydrogen isotope; the molecular hydrogen can therefore comprise one or two atoms of H, D or T. If in the following text there is a mention of "hydrogen" or if the symbol "H" is employed, the respective passage should be understood on the above lines if there is no express reference to "light hydrogen".

The Drawings, illustrating an example:

DESCRIPTION OF THE PREFERRED EMBODIMENT

In the case of a preferred embodiment of the pumping method in accordance with the invention for a hydrogen molecule laser the electronic excitation of the hydrogen molecule leads to a binding molecular state, from which a stimulated or forced transition into a non-binding molecular state is possible, by collisions with metastable argon ions. Preferably the collisions with the metastable Ar+ ions lead to the production by excitation of the triplet state

from which a transition into the non-binding (dissociated) state

is possible by the emission of a continuum between 1600 A and 3600 A. The excitation process is described in the equation

(1)

and is exothermic with an energy excess of 4.6 eV to 6.8 eV (depending on the state of excitation of the argon ion). The collision process is a true two-body collision.

Figure 1:
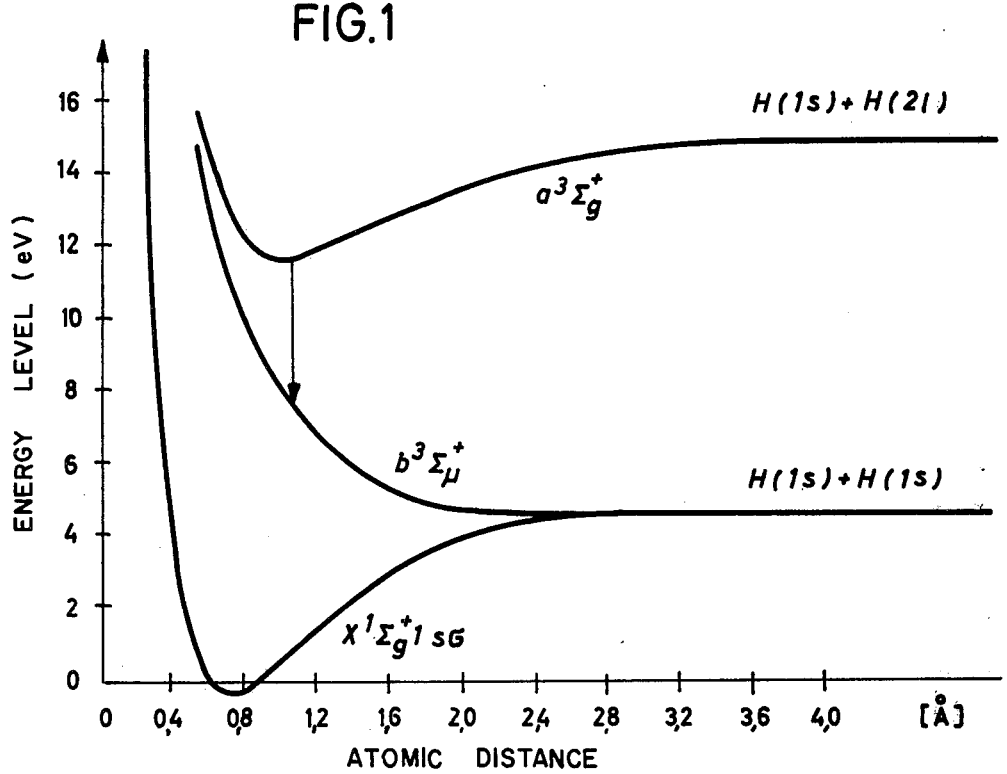
FIG. 1 shows an excerpt from the energy level diagram of the molecule of light hydrogen.

The above mentioned energy levels, which play a role in the excitation of the hydrogen and of the laser emission, are represented in FIG. 1.

The atomic distance in Ångstrom units is plotted while on the abscissa.

The potential energy in electron volts is plotted on the ordinate.

Metastable states of singly ionized argon and their production have been described in the literature (H. D. Hagstrum, Phys. Rev. 104, 309, 1956). They lie between 16.4 eV and 18.6 eV above the Ar+ ground state.

The effective cross-section of the collision process in accordance with the equation (1) amounts at 0.5 eV$_{cm}$ of collision energy to approximately 1 Å$^2$ and increases with a decreasing energy. The index "cm" signifies that the collision energy relates to the center of mass system.

Since the transition from the above mentioned binding molecular state into the non-binding molecular state corresponds to a true continuum, the wavelength of the laser radiation can be continuously tuned between approximately 1600 Å and 3600 Å, for example conventionally using dispersive elements such as diffraction gratings or prisms in the optical resonator.

Instead of argon it is also possible to use other noble gases, which have suitable metastable states of their ions or possibly neutral atoms. In the case of Ar+ the efficiency is, however, particularly high. In the case of argon and the heavier noble gases it is preferred to use metastable states of the singly ionized atom, while in the case of lighter noble gases it is possible to operate with metastable states of the neutral atom.

A particular advantage of the gas laser in accordance with the invention is that the ground state of the laser transition is always empty, since the hydrogen molecule is not stable in this state and instead dissociates. The amplification therefore is always at a maximum value.

Both excitation by metastable, preferably singly ionized noble gas atoms and also the transition between the states $$a^3 \Sigma_g^+ \text{ and } b^3 \Sigma_u^+$$

constitute significant features of the present invention.

The initial state of the laser transition does not have to be excited directly. If appropriate, it is also possible first to excite higher molecular states, which populate the $$a^3 \Sigma_g^+$$

state of interest via the emission of IR-fluorescence radiation. The laser then operates with a 2-photon process.

Figure 2:
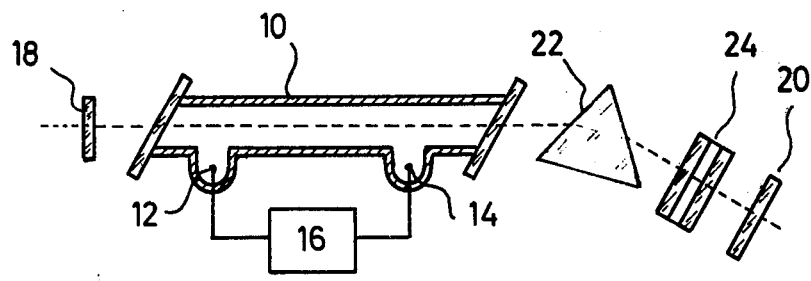
FIG. 2 shows a schematic representation of an embodiment of a hydrogen laser in accordance with the invention.

A gas laser in accordance with the invention can in principle be constructed like a conventional gas laser, for example in the form of a typical argon ion laser, as is represented schematically in FIG. 2. The gas laser in accordance with FIG. 2 comprises a laser tube 10, in which, for example, a mixture of argon and hydrogen is located with a pressure of for example $10^{-3}$ to approximately a few Torr. The hydrogen partial pressure and the argon partial pressure respectively amount to approximately 0.15 Torr. The partial pressure ratio of $H_2$ and Ar can however substantially depart from the value of 1:1, for example by a factor of 2 or 3 in either direction.

The laser tube 10 comprises two lateral extensions into which two electrodes 12 and 14 are fused, which serve as current supply leads for the gas discharge produced in the gas filling in the tube 10. The electrodes 12 and 14 are connected with a current supply 16, which for example can supply DC, pulsed current or possibly alternating current as well. It is also possible to operate with an electrodeless gas discharge. The gas discharge is preferably produced with a comparatively high voltage, since the yield of metastable argon ions increases with an increase in voltage. The gas pressure is determined by a compromise since the high hydrogen partial pressure leads to high degrees of efficiency of radiation, while on the other hand with an increase in gas pressure the mean life of the metastable states decreases, since they can more readily release energy by collisions.

The laser tube 10 can be terminated by a Brewster window as is conventional, or it can be open. In the latter case the whole system will then be located in a gas atmosphere with a suitable pressure and suitable composition. The laser tube 10 is arranged in the beam path of an optical resonator, which is defined by a partly transparent mirror 18 and a mirror 20 with the highest possible degree of reflection. Furthermore the system comprises, besides the laser tube 10, a prism 22 and an etalon 24 which can consist of two plane parallel quartz glass plates. The elements 22 and 24 serve are used to set the wavelength of the laser radiation and for limiting its band width. The operating voltage of the gas discharge between the electrodes 12 and 14 depends on the gas pressure and will typically be up to a few hundred Volts. The current is limited by a series resistor or the like in the power supply 16.

In the case of a gas laser of the type in which the excitation is to an energy level from which transition to a non-binding state is possible, argon ion densities of approximately $10^{15}$ cm$^{-3}$ with a concentration of at least 3% of metastable Ar$^+$ can be achieved. With a laser tube having a length of 80 cm, a laser radiation wavelength of 2490 Å (in the case of which all vibrational levels of hydrogen make a contribution to emission) and a radiation band width of 0.5 Å it is possible to calculate that the concentration of excited hydrogen molecules amounts to approximately $1.5 \times 10^{12}$ cm$^{-3}$, about 7 times higher than the threshold density for laser radiation.

We claim:

1. A method for exciting molecular hydrogen in a hydrogen laser in which hydrogen and a noble gas are confined in a laser vessel, and stimulated to laser action, comprising the steps of exciting noble gas atoms to their single ionized state by applying energy to the noble gas in the laser vessel, said noble gas ions transferring energy to the hydrogen molecules for stimulating said laser action;

and wherein the level of excitation is selected to provide for laser transition between the $$a^3 \Sigma_g^+ \text{ and the } b^3 \Sigma_u^+$$

states to provide for radiation output forming a continuum between 1600 and 3600 Å units.

2. A method in accordance with claim 1, wherein the noble gas comprises at least one of: argon; krypton; xenon.

3. A method for excitation of molecular hydrogen in a hydrogen laser in which hydrogen and a noble gas are confined in a laser vessel, and stimulated to laser action by applying energy to the gases in the laser vessel, wherein the energy level of excitation applied to the hydrogen molecules is selected to provide for stimulated forced transition into a non-binding or dissociative molecular state.

4. A method in accordance with claim 3, wherein the excitation energy is applied to singly ionized noble gas atoms and exciting said hydrogen molecules to a metastable state of excitation.

5. A method in accordance with claim 3, wherein the noble gas comprises at least one of: argon; krypton; xenon.

6. A method according to claim 3, wherein the excited level is the level $$b^3 \Sigma_u^+.$$

7. A hydrogen laser having a gas filling which comprises molecular hydrogen as a laser medium, and means to excite the molecular hydrogen, wherein the gas filling comprises at least one noble gas in addition to hydrogen and the excitation means ionize the noble gas atoms to produce singly ionized noble gas atoms and excite said noble gas atoms to a metastable state of excitation, and to transition between the $$a^3 \Sigma_g^+ \text{ and the } b^3 \Sigma_u^+$$

states to provide for radiation output which forms a continuum between 1600 and 3600 Å units.

8. A hydrogen laser in accordance with claim 7, wherein the gas filling consists of a mixture of hydrogen and at least one of: argon; krypton; xenon.

9. A hydrogen laser in accordance with claim 7, wherein the excitation means comprises means to produce a gas discharge in the gas filling.

10. A hydrogen laser in accordance with claim 7, wherein the excitation means comprises means to produce a non-self-supporting gas discharge in a gas filling.

* * * * *